US012613376B2

(12) United States Patent
    Chen et al.

(10) Patent No.: US 12,613,376 B2
(45) Date of Patent: Apr. 28, 2026

(54) OPTICAL ISOLATORS FOR MULTI-CHANNEL OPTICAL INTERCONNECTS

(71) Applicant: Intel Corporation, Santa Clara, CA (US)

(72) Inventors: Dekang Chen, Chandler, AZ (US); Nicholas Psaila, Lanark (GB); Zhichao Zhang, Chandler, AZ (US); Eric J.M. Moret, Beaverton, OR (US); Wesley B. Morgan, Lake Oswego, OR (US); Srikant Nekkanty, Chandler, AZ (US); Sang Yup Kim, Sunnyvale, CA (US); Mohanraj Prabhugoud, Beaverton, OR (US); Chao Tian, Bozeman, MT (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 18/216,494

(22) Filed: Jun. 29, 2023

(65) Prior Publication Data

US 2025/0004205 A1      Jan. 2, 2025

(51) Int. Cl.
    *G02B 6/27*          (2006.01)
    *G02B 6/42*          (2006.01)
(52) U.S. Cl.
    CPC ......... *G02B 6/2746* (2013.01); *G02B 6/4206* (2013.01); *G02B 6/4214* (2013.01)

(58) Field of Classification Search
    CPC ...... G02B 6/32; G02B 6/4206; G02B 3/0087; G02B 6/4214; G02B 27/0955; G02B 2006/12102
    USPC ......................................................... 359/484
    See application file for complete search history.

(56) References Cited

U.S. PATENT DOCUMENTS

| | | | | |
|---|---|---|---|---|
| 4,462,699 | A | * | 7/1984 | Shaw .................... G02B 6/2826 |
| | | | | 374/E11.015 |
| 5,706,371 | A | * | 1/1998 | Pan ...................... G02B 6/2746 |
| | | | | 385/11 |
| 11,808,988 | B2 | | 11/2023 | Abraham et al. |
| 2002/0196998 | A1 | * | 12/2002 | Steinberg ............... G02B 6/322 |
| | | | | 385/39 |
| 2022/0413210 | A1 | | 12/2022 | Liu et al. |
| 2022/0413214 | A1 | | 12/2022 | Liu et al. |
| 2024/0027697 | A1 | | 1/2024 | Morgan et al. |

FOREIGN PATENT DOCUMENTS

| | | | | | |
|---|---|---|---|---|---|
| CN | 212749310 | * | 3/2021 | ............. | G02B 6/293 |
| JP | H05188324 | * | 7/1993 | ............. | G02B 27/28 |
| JP | H0949989 | * | 2/1997 | ............. | G02B 27/28 |
| JP | H1164790 | * | 3/1999 | ............. | G02B 27/28 |

* cited by examiner

*Primary Examiner* — Daniel St Cyr
(74) *Attorney, Agent, or Firm* — Compass IP Law PC

(57)                    ABSTRACT

Multichannel optical assemblies for optical IO (input output) systems are provided. The optical assemblies comprise an optical isolator. In some examples the optical assemblies also comprise an array of GRIN lenses. In other examples, the optical assemblies also comprise micromirrors.

20 Claims, 17 Drawing Sheets

1100

Processor
1110

Graphics
1140

Accelerators
1142

Interface
1112

Memory subsystem 1120

Memory
controller
1122

Memory 1130

OS 1132

Apps 1134

Processes
1136

Network
Interface
1150

Interface
1114

Peripheral
Interface
1170

I/O Interface
1160

Controller
1182

Storage
1184

Storage subsystem 1180

OPTICAL ISOLATORS FOR MULTI-CHANNEL OPTICAL INTERCONNECTS

FIELD

Descriptions are generally related to optical input-output (IO) systems for computing, and more particularly to optical isolators for optical IO architectures.

BACKGROUND

Semiconductor chips are central to intelligent devices and systems, such as personal computers, laptops, tablets, phones, servers, and other consumer and industrial products and systems. Manufacturing semiconductor chip interconnects presents a number of challenges and these challenges are amplified as devices become smaller and performance demands increase. In order to meet ever increasing bandwidth requirements for chip-to-chip and system-to-system data links, many optical input-output (IO) architectures are implemented with large optical channel counts, necessitating high-density laser arrays at sub-millimeter channel-to-channel pitch.

Optical isolators can be an important part of optical IO architectures. An optical isolator is a device that allows light to be transmitted only in one direction. Optical isolators can be used to prevent reflected light from traveling back into sensitive devices such as into the cavity of a laser.

A factor that limits the optical channel count and density in semiconductor dies with single-mode laser arrays is the need to have optical isolators in the transmit beam path as close to the laser output as possible. An intervening physical interface between the laser output and optical isolator in which the optical reflection cannot be controlled to less than a critical value, can create a situation where the single-mode laser output (power, wavelength, phase) can become unstable even with moderate back-reflection and result data transmission errors.

The creation of compact, low loss and low cost optical isolators is challenging due to typically requiring a combination of free space and optical fiber coupled elements, which need to be assembled with tight mechanical alignment tolerances. These optical isolators frequently are assembled individually and often require time consuming and expensive active alignment processes.

BRIEF DESCRIPTION OF THE DRAWINGS

The figures are provided to aid in understanding embodiments of the invention. The figures can include diagrams and illustrations of exemplary structures, assemblies, data, methods, and systems. For ease of explanation and understanding, these structures, assemblies, data, methods, and systems, the figures are not an exhaustively detailed description. The figures therefore should not be understood to depict the entire metes and bounds of structures, assemblies, data, methods, and systems possible without departing from the scope of embodiments of the invention.

Figure 1A:
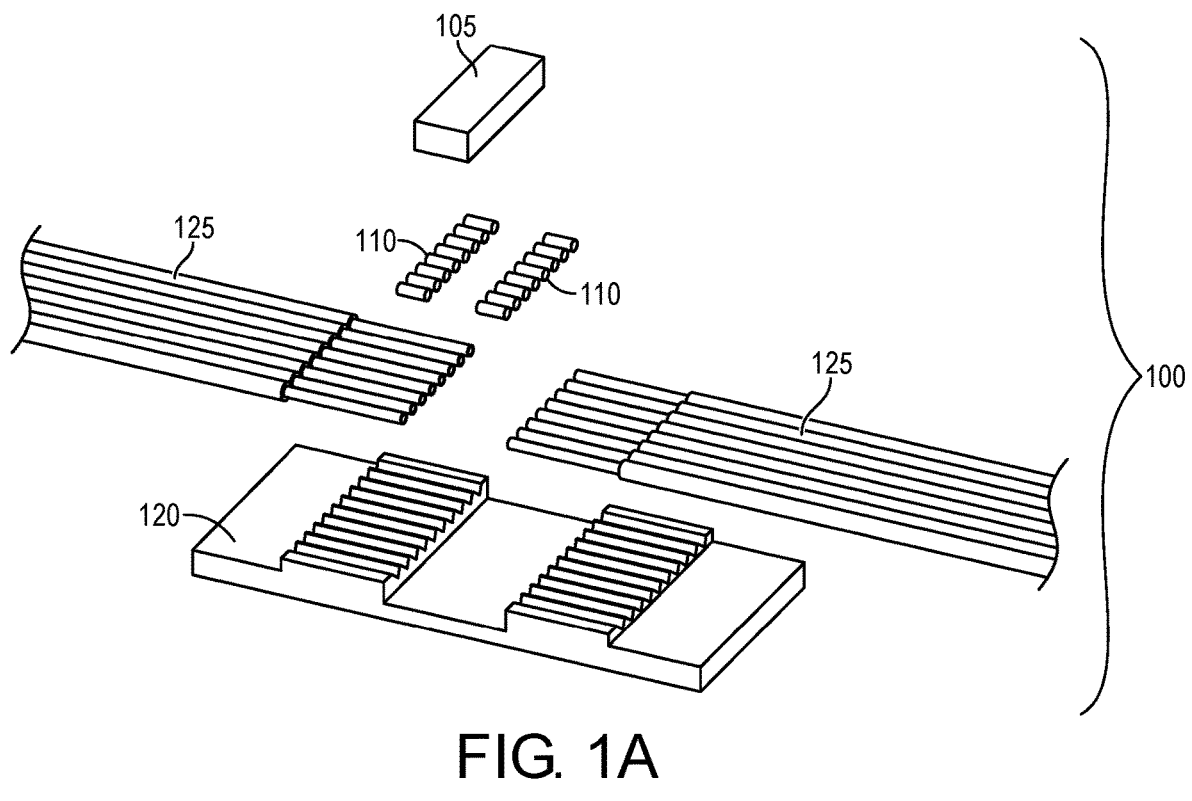
FIGS. 1A-1B provide views of an exemplary multi-channel optical assembly.

Descriptions of certain details and implementations follow, including non-limiting descriptions of the figures, which depict some examples and implementations.

DETAILED DESCRIPTION

References to one or more examples are to be understood as describing a particular feature, structure, or characteristic included in at least one implementation of embodiments of the invention. The phrase "one example" or "an example" are not necessarily all referring to the same example or embodiment. Any aspect described herein can potentially be combined with any other aspect or similar aspect described herein, regardless of whether the aspects are described with respect to the same figure or element.

The words "connected" and/or "coupled" can indicate that two or more elements are in direct physical or electrical contact with each other. The term "coupled," however, can also mean that two or more elements are not in direct contact with each other and are instead separated by one or more elements but they may still co-operate or interact with each other, for example, physically, magnetically, optically, or electrically.

The words "first," "second," and the like, do not indicate order, quantity, or importance, but rather are used to distinguish one element from another. The words "a" and "an" herein do not indicate a limitation of quantity, but rather denote the presence of at least one of the referenced items. The terms "follow" or "after" can indicate immediately following or following after some other event or events. Other sequences of operations can also be performed according to alternative embodiments. Furthermore, additional operations may be added or removed depending on the particular application.

Disjunctive language such as the phrase "at least one of X, Y, or Z," is used in general to indicate that an element or feature, may be either X, Y, or Z, or any combination thereof (e.g., X, Y, and/or Z). Thus, this disjunctive language should be understood not to imply that certain embodiments require at least one of X, at least one of Y, or at least one of Z to each be present.

Terms such as chip, die, IC (integrated circuit) chip, IC die, or semiconductor chip are used interchangeably and refer to a semiconductor device comprising integrated circuits.

Flow diagrams as illustrated herein provide examples of sequences of various process actions. The flow diagrams can indicate operations to be executed by a software or firmware routine, as well as physical operations. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted and not all implementations will perform all actions.

Various components described can be a means for performing the operations or functions described. Each component described includes software, hardware, or a combination of these. The components can be implemented as software modules, hardware modules, special-purpose hardware (for example, application specific hardware, application specific integrated circuits (ASICs), digital signal processors (DSPs), etc.), embedded controllers, or hardwired circuitry).

To the extent various computer operations or functions are described herein, they can be described or defined as software code, instructions, configuration, and/or data. The software content can be provided via an article of manufacture with the content stored thereon, or via a method of operating a communication interface to send data via the communication interface. A machine readable storage medium can cause a machine to perform the functions or operations described, and includes any mechanism that stores information in a tangible form accessible by a machine (e.g., computing device), such as recordable/non-recordable media (e.g., read only memory (ROM), random access memory (RAM), magnetic disk storage media, optical storage media, flash memory devices). A communication interface includes any mechanism that interfaces to, for example, a hardwired, wireless, or optical medium to communicate to another device, such as, for example, a memory bus interface, a processor bus interface, an Internet connection, a disk controller.

For a semiconductor die comprising an array of lasers, a semiconductor die comprising one or more integrated lasers, or other assembly comprising an array of lasers and, optionally, integrated modulators and other active and passive optical devices, a location for the optical isolator assembly is at the optical output facets of the die. Other active and passive optical devices include for example, variable optical attenuators, optical amplifiers, photodetectors, optical switches, power combiners and/or wavelength selective multiplexers, power splitter and/or wavelength selective filters. Another optional location for the optical isolator is in-line in the optical fiber array in an assembly. The in-line location can be one that serves as an intermediate transition to couple optical output from the photonics die (or other laser assembly) to optical fiber cables that are part of the optical interconnect infrastructure of an overall computing system and/or network.

For multi-channel optical isolators, the coupling efficiency of the optical input beams into the output waveguide array (e.g., single-mode fiber array) is a large contributing factor to the insertion loss experienced. High insertion loss leads to higher electrical power consumption and/or lower optical link power budget. Higher power consumption and a lower optical link power budget are less desirable outcomes.

Optical isolators described herein can also be used with other types of lasers, such as, for example, ones that are not an integral part of a semiconductor die that comprises circuits (i.e., intelligence). Stand-alone lasers can be otherwise coupled through chip or multi-chip packaging, boards, interposers, (etc.) to semiconductor dies. Examples of optical isolators described herein are used with a variety of types of lasers, such as for example, vertical-cavity surface-emitting lasers (VCSELs), Fabry Perot (FP) lasers, distributed feedback (DFB) lasers, and distributed Bragg reflector (DBR) lasers.

Figure 1B:
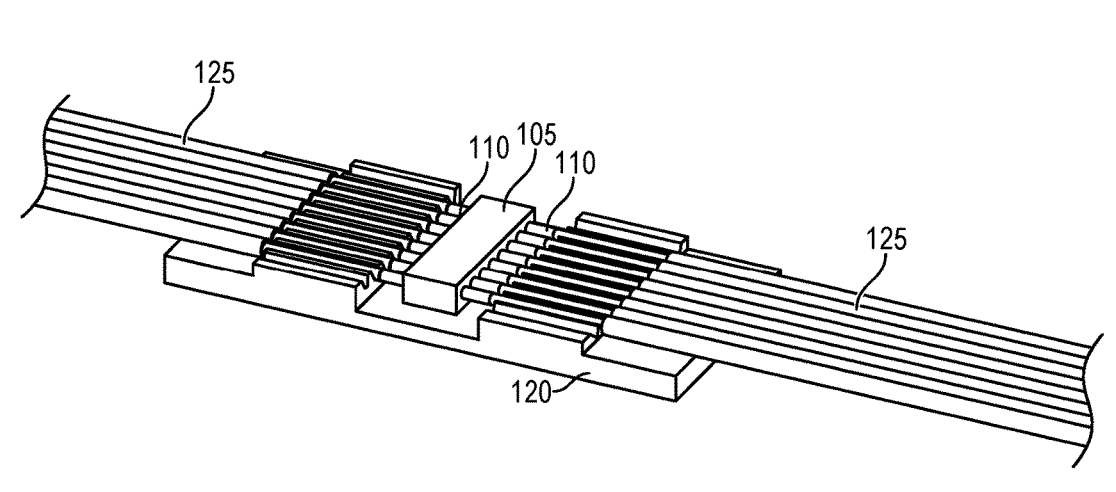

FIGS. 1A and 1B show an expanded view and an assembled view, respectively, of an exemplary multi-channel optical isolator assembly. The multi-channel optical isolator assembly is useful, for example, as part of an optical IO infrastructure in a computing system. In FIGS. 1A-1B, the optical isolator assembly 100 includes an optical isolator 105 and two gradient index (GRIN) lens arrays 110. The optical isolator 105 can be, for example, a Faraday rotator (e.g., a magneto-optic crystal) sandwiched between polarization filters, a latching magneto-optic crystal such as a latching garnet, or magneto-optic crystals which require permanent magnets attached. The GRIN lens arrays 110 can be, for example, segments of GRIN multi-mode fibers arrayed in parallel. In exemplary assemblies, the GRIN multi-mode fibers can be arrayed with a center-to-center pitch of ≤0.25 mm. Arraying the GRIN multi-mode fibers tightly (e.g., with a center-to-center pitch of ≤0.25 mm) to form the input and output lenses 110, can create a highly compact multi-channel optical isolator assembly.

In FIGS. 1A-1B, the multi-channel optical isolator assembly 100 additionally includes a substrate 120 that has an array of grooves, which can optionally be V-shaped grooves. The grooves of the substrate 120 are designed to receive fibers of the fiber arrays 125. In FIG. 1B, the fibers of the two fiber arrays 125 can be seen resting in the two sets of grooves of the substrate 120. The fiber arrays 125 can be arrays of single mode fibers. A single mode fiber array 125 can be, for example, comprised of non-polarization-maintaining fibers at the input of the GRIN lens array 110. Although eight channels are shown in FIGS. 1A-1B (i.e., arrays of fibers 125 have 8 fibers and GRIN lens arrays have 8 fibers and are 1×8 arrays), larger and smaller numbers of channels (fibers in the arrays) are possible as well. Advantageously, since examples of optical isolators described herein are compact, they can be expanded to more channels without imposing as great a device footprint penalty.

Additionally, optical index-matching epoxy (not shown) can be placed between the optical elements of the optical isolator assembly 100. For example, the index-matching epoxy can be placed between the fiber array 125 and GRIN lens array 110, and between GRIN lens array 110 and optical isolator 105. The index-matching epoxy can completely seal and reduce disturbance to the optical beam path even under changes from the outside environment, such as immersion in a cooling bath or accumulation of dust over prolonged operation.

Figure 2A:
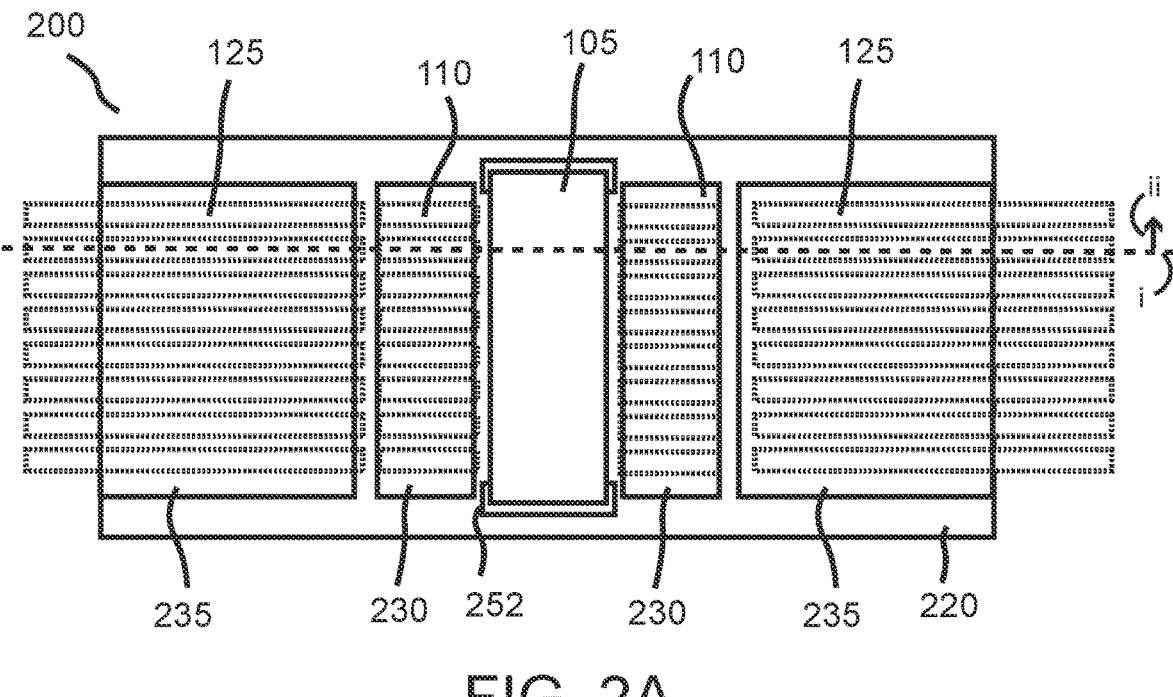
FIGS. 2A-2C illustrate views of an additional exemplary multi-channel optical assembly.
Figure 2B:
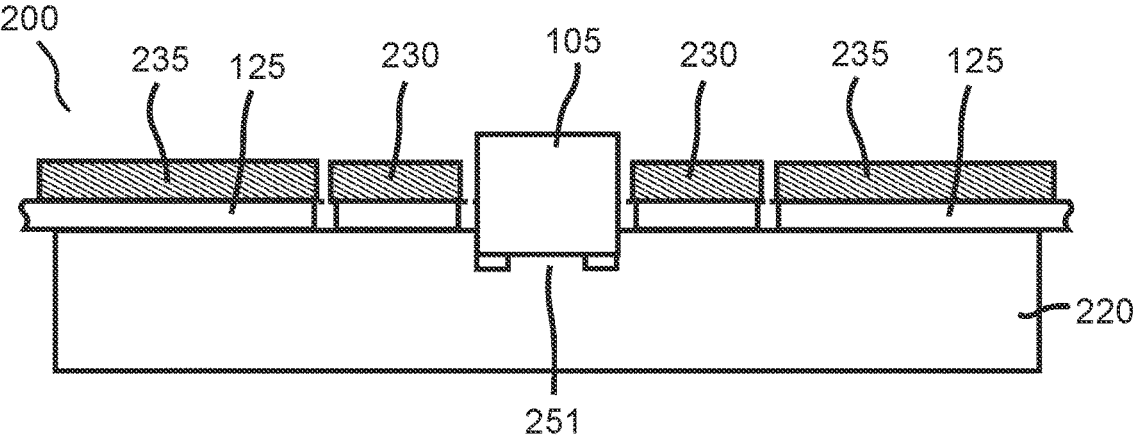
Figure 2C:
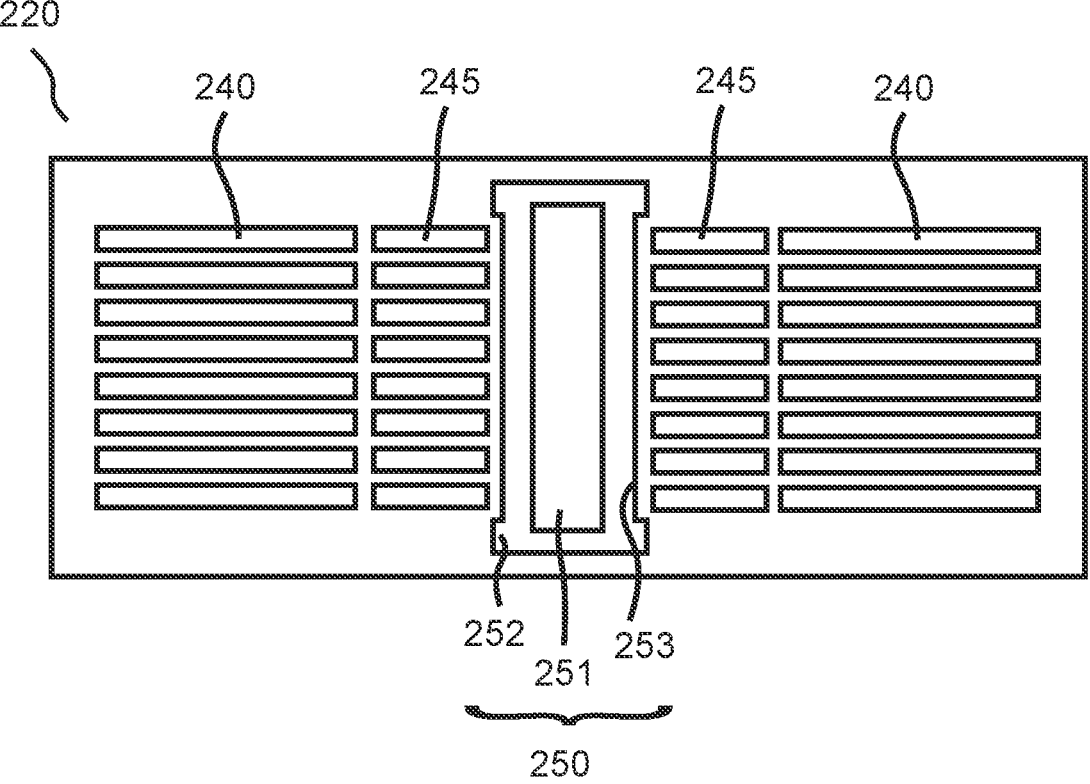

FIGS. 2A-2C illustrate views of an additional example of a multi-channel optical isolator assembly employing GRIN lens arrays. FIG. 2B provides a side view of a slice taken along dashed line "i" in the direction of arrow "ii" (shown in FIG. 2A) of multi-channel optical isolator assembly 200. In FIGS. 2A-2B, the multi-channel optical isolator assembly 200 includes an optical isolator 105, two GRIN lens arrays 110, and two fiber arrays 125, which are similar the same-numbered elements of FIGS. 1A-1B. The descriptions of the same-numbered elements of FIGS. 1A-1B are applicable for FIGS. 2A-2C also. The GRIN lens arrays 110, and fiber arrays 125 are shown with dashed lines in FIG. 2A, because there are glass lids 230 on the GRIN lens arrays 110 and glass lids 235 on fiber arrays 125. In FIG. 2A the GRIN lens arrays 110 and fiber arrays 125 are in some parts viewed through the glass lids 230 and glass lids 235, respectively. The multi-channel optical isolator assembly 200 additionally includes alignment substrate 220, which can be a monolithic alignment substrate.

FIG. 2C shows alignment substrate 220 viewed from the same direction as in FIG. 2A. Alignment substrate 220 includes two arrays of fiber grooves 240 for receiving the fibers of fiber arrays 125 and two additional arrays of grooves 245 for receiving the fibers of the GRIN lens arrays 110. Fiber array grooves 240 and/or GRIN lens array grooves 245 can be V-shaped grooves. Additionally, alignment substrate includes alignment cavity 250 for receiving optical isolator 105. Alignment cavity 250 includes optional shaped recesses 251 that allow space for a gripper tool to place optical isolator 105 into cavity 250. Alignment cavity 250 optionally additionally includes raised standoff 252 (which can also be viewed in FIG. 2A). Alignment cavity 250 provides surfaces 253 that allow passive angular alignment for the assembly of optical isolator assembly 200.

Additionally, index matching epoxy (not shown) can be placed between the optical elements of the optical isolator assembly 200. For example, the index matching epoxy can be placed between the fiber array 125 and GRIN lens array 110, and between GRIN lens array 110 and optical isolator 105. The index matching epoxy is as described with respect to FIGS. 1A-1B herein.

Figure 3A:
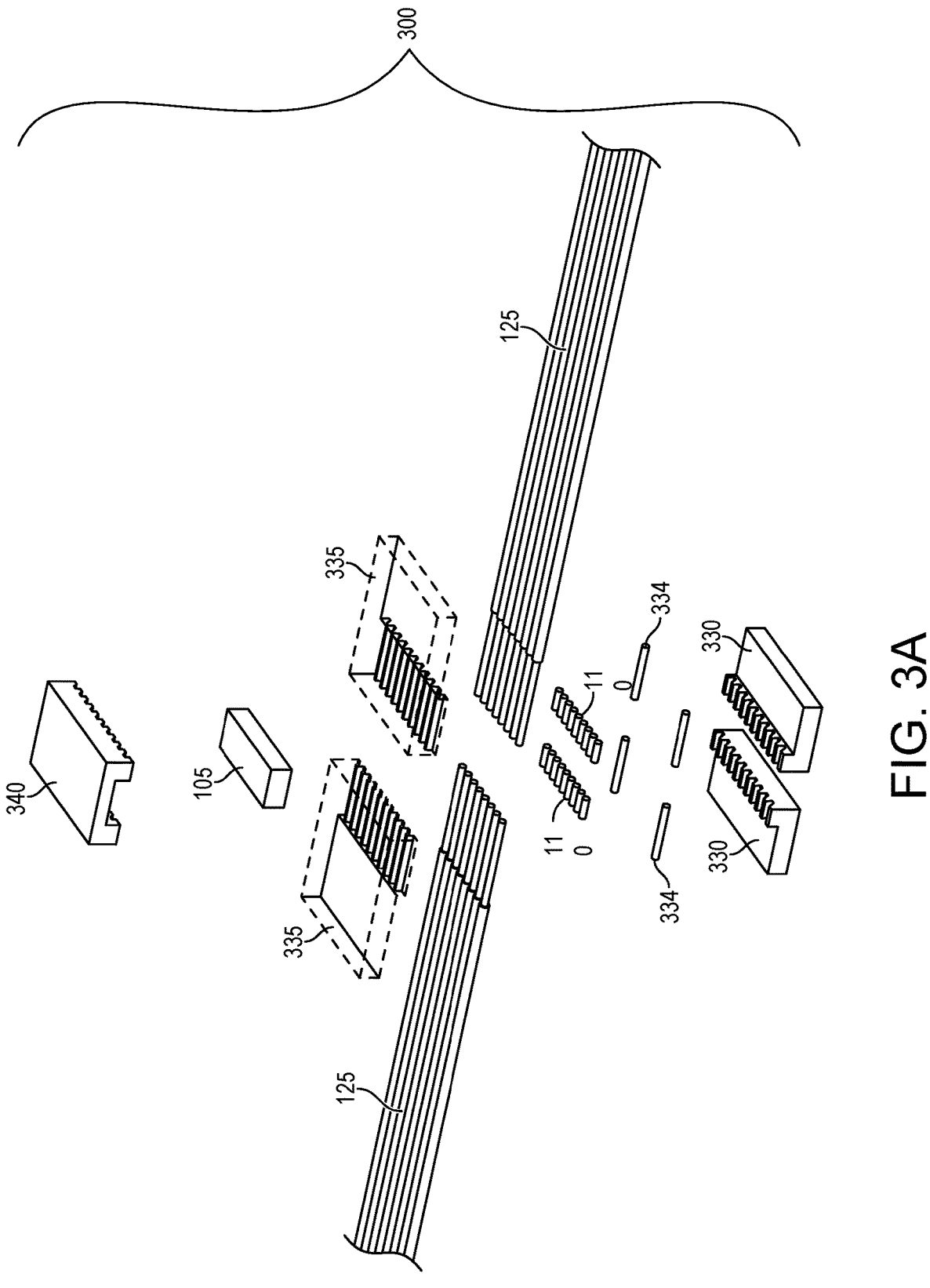
FIGS. 3A-3B show a further exemplary multi-channel optical assembly.
Figure 3B:
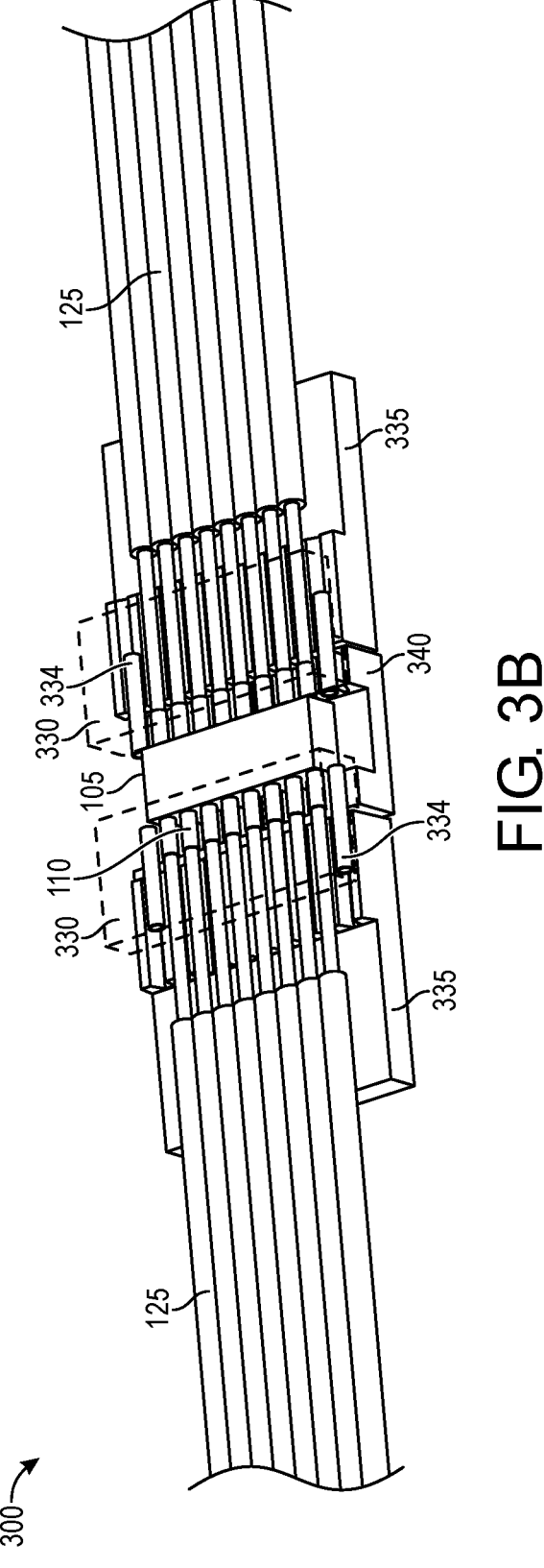

FIGS. 3A-3B provide a further example of a multi-channel optical isolator assembly. FIGS. 3A and 3B show an expanded view and an assembled view, respectively. In FIGS. 3A-3B, a multi-channel optical isolator 300 includes an optical isolator 105, two GRIN lens arrays 110, and two fiber arrays 125, which are similar the same-numbered elements of FIGS. 1A-1B. The descriptions of the same-numbered elements of FIGS. 1A-1B are applicable for FIGS. 3A-3B also. GRIN lens substrates 330 include grooves for the fibers of the GRIN lens and two extra grooves for alignment pins 334. An alignment pin 334 can have two different widths, a first width that fits securely into the grooves of the GRIN lens substrate 330 and a second width that fits securely into the grooves of the fiber array substrates 335. Fiber array substrates 335 include grooves for the fibers of fiber arrays 125 and two extra grooves for receiving alignment pins 334. Additionally, optical isolator substrate 340 includes arrays of grooves into which the fibers of the GRIN lens arrays 125 fit and can allow for passive alignment during device assembly. The grooves of the substrates 330, 335, and/or 340 can be V-shaped grooves.

Additionally, index matching epoxy (not shown) can be placed between the optical elements of the optical isolator assembly 300. For example, the index matching epoxy can be placed between the fiber array 125 and GRIN lens array 110, and between GRIN lens array 110 and optical isolator 105. The index matching epoxy is as described with respect to FIGS. 1A-1B herein.

Figure 4A:
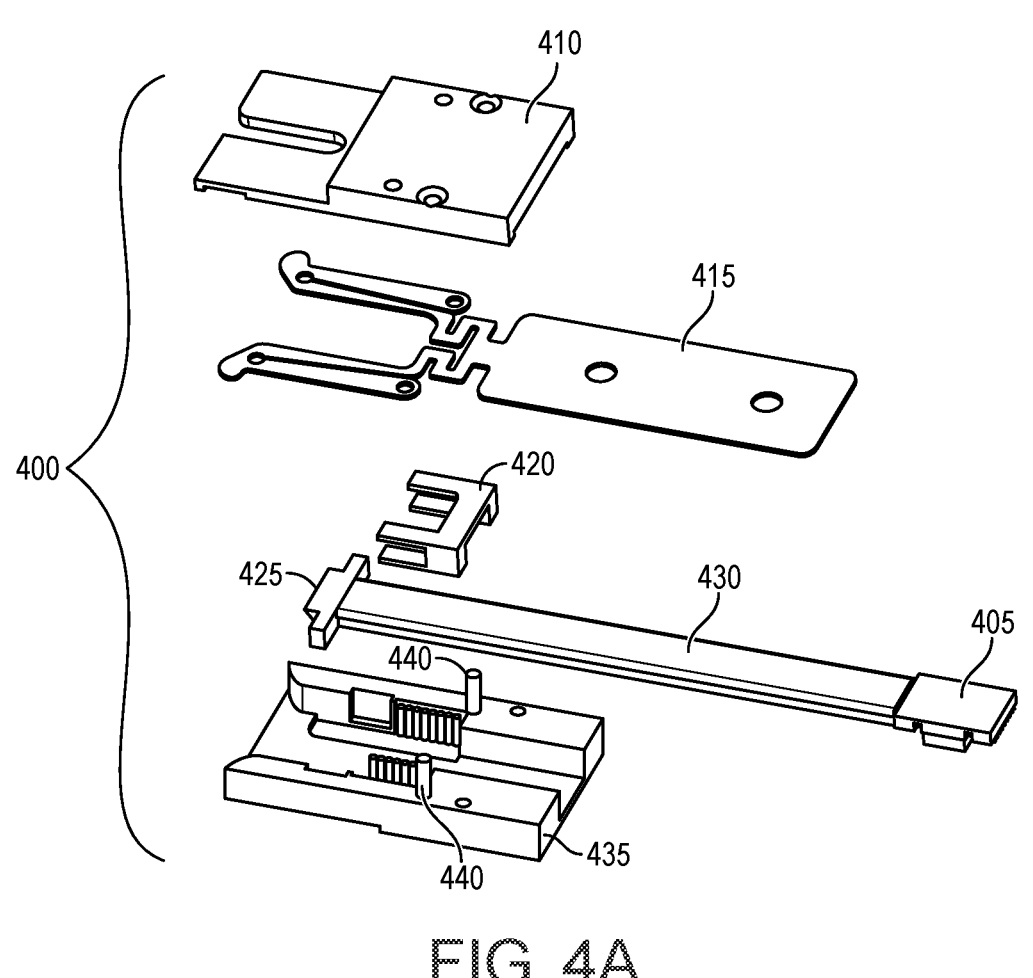
FIGS. 4A-4B illustrate an exemplary optical connector that includes a multi-channel optical assembly.
Figure 4B:
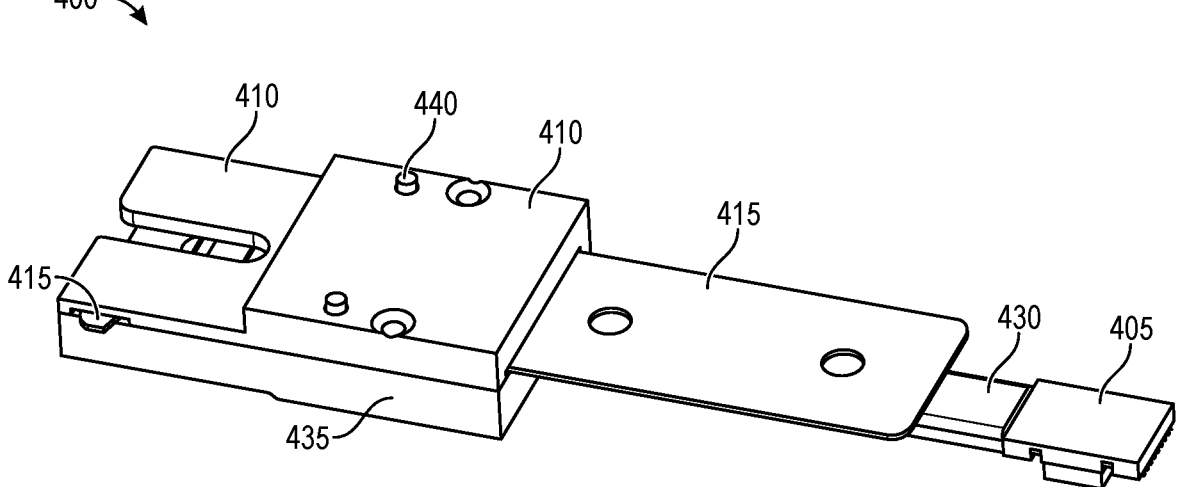

FIGS. 4A and 4B provide an expanded view and an assembled view, respectively, of an optical connector 400 that includes a multi-channel optical isolator assembly 405. The multi-channel optical isolator assembly 405 is any of the multi-channel optical assemblies described herein. The optical connector 400 additionally includes a cover 410, a latch spring 415, an internal connector 420, a ferrule 425, an optical ribbon 430, and a housing 435. Housing 435 includes assembly pins 440. Internal connector fits around the ferrule 425 and ribbon 430 assembly to hold in within the cavity of the housing 435. Although FIGS. 4A and 4B show the optical isolator assembly 405 outside the housing 435 and cover 410, and beyond the extent of the latch spring 415, other examples include configurations where the optical ribbon 430 is shorter and the optical isolator assembly 405 is either enclosed within the housing 435 and cover 410, or within the extent of the latch spring 415. Other optical connectors that include the multi-channel optical isolator assemblies described herein are also possible.

Figure 5A:
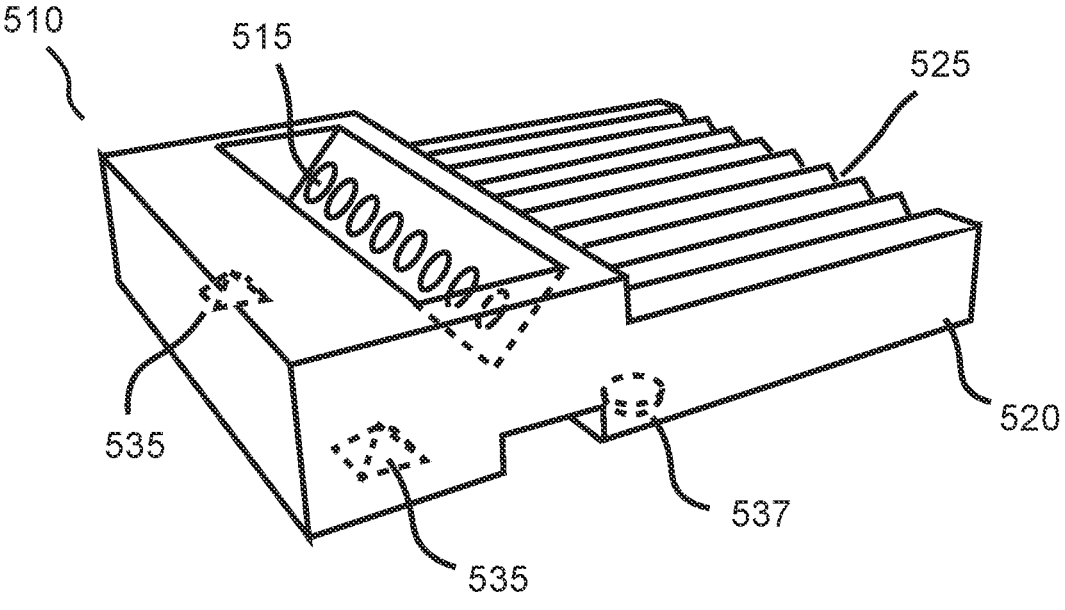
FIGS. 5A-5D show an additional exemplary multi-channel optical assembly.
Figure 5B:
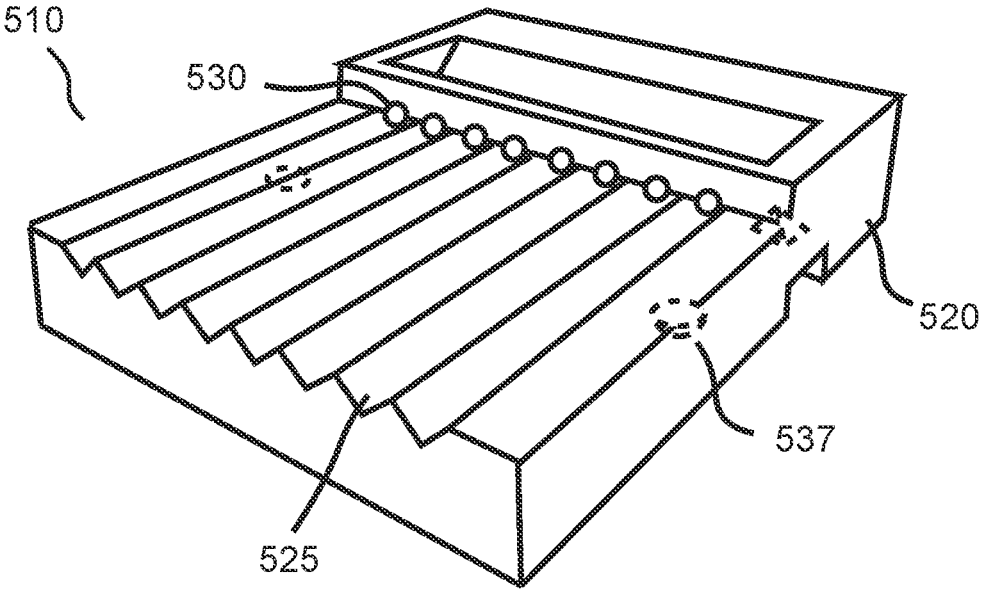
Figure 5C:
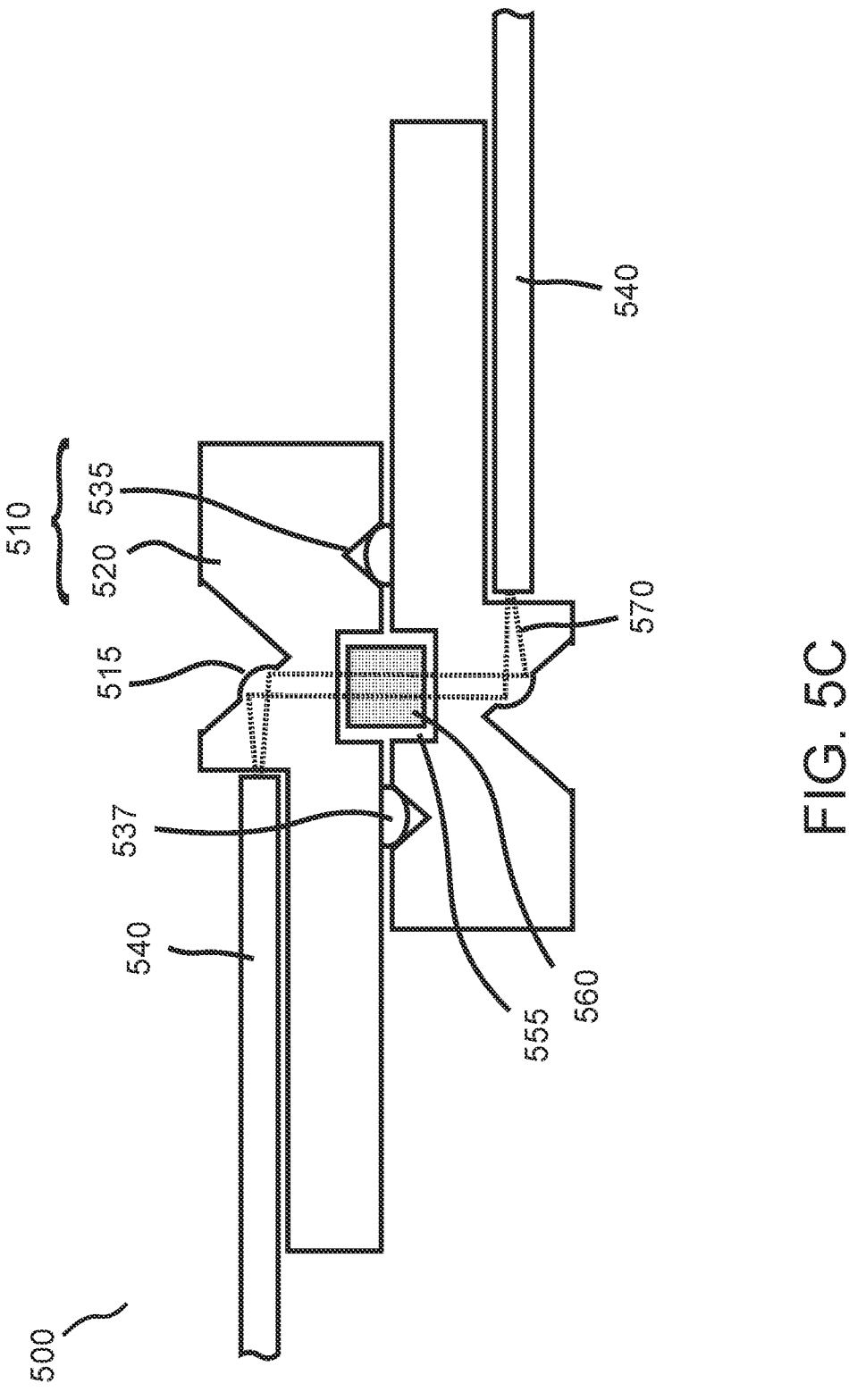
Figure 5D:
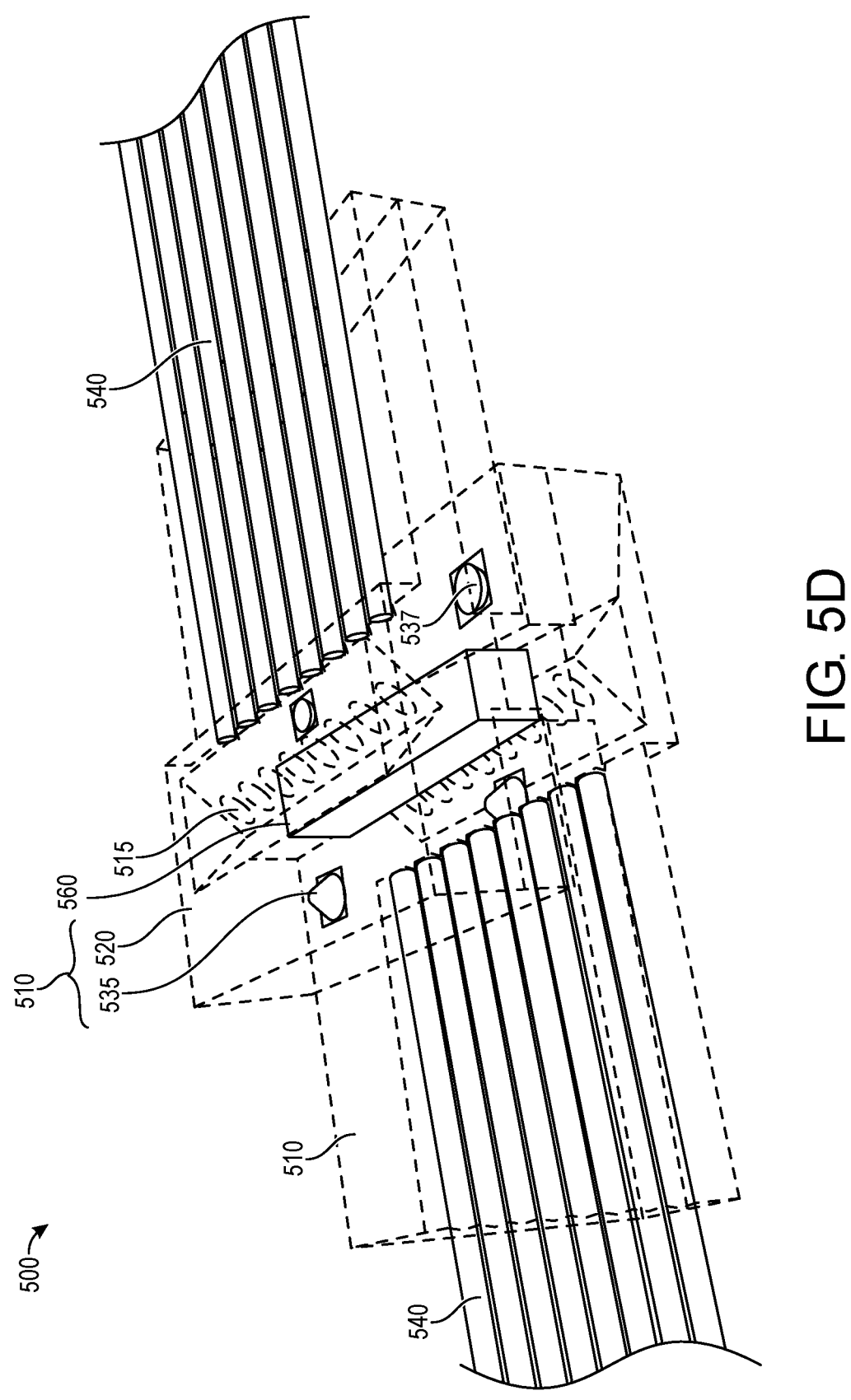

FIGS. 5A-5D illustrate an additional exemplary multi-channel optical isolator assembly 500. FIGS. 5A-5B show a multi-channel collimator array block 510 which forms a part of multi-channel optical isolator assembly 500. FIG. 5C shows a simplified cut-through section of an assembled optical isolator assembly 500 and FIG. 5D illustrates an assembled multi-channel optical isolator assembly 500.

In FIGS. 5A and 5B, the multi-channel collimator array block 510 includes curved micromirrors 515, an array of grooves 525, a micro-optic block body 520, and first collimator array block alignment features 535 and second collimator array block alignment features 537. Optical fibers are placed in the array of grooves 525 can, for example, comprise V-shaped grooves. The array grooves 525 can provide alignment of the optical fiber to the micromirror array during device assembly. The first collimator array block mechanical alignment features 535 can be cavities for receiving second collimator array block mechanical alignment features 537. Second alignment features can be bumps, for example. The alignment features (535 and 537) can consist of combinations of protrusions and corresponding cavities, for example hemispheric bumps and pyramidal cavities. The alignment features can be the same on both sides, or can have opposing genders. The micro optic body 520 can be a monolithic manufactured block of material, such as, for example glass, a polymer, or other transparent material.

FIG. 5B additionally illustrates optional optical fiber sockets (cavities) 530 that can allow positioning and vertical constraint of the optical fibers during assembly. Optical fiber sockets 530 can be, for example, blind holes capable of receiving an optical fiber. Fiber grooves of the array of fiber grooves 525 can be terminated in part or in full by socket cavities 530. Vertical constraint the array of fibers 540, can avoid needing to push the array of fibers 540 with a capping piece (not shown) during an adhesive curing process that is part of device assembly.

The micromirrors 515 can be, for example, total internal reflection (TIR) mirrors, or alternatively they can be a reflective material, such as a metal, that is a coating attached to block 520. In further alternate examples, the micromirrors 515 can be a dielectric stack to provide tailored reflectivity, or functions such as wavelength selectivity. The dielectric stack can be coatings designed to provide functions such as tailored reflectivity or wavelength selectivity. Optionally, thin film polarizers can be patterned onto the mirror surface, removing the requirement to include the polarizers either side of the magneto-optic crystal, which can provide an advantageous form factor reduction, by reducing the thickness of the overall assembly.

FIGS. 5C and 5D illustrate an assembled multi-channel optical isolator assembly 500. The mating of two multi-channel collimator array blocks 510 creates cavity region 555 for optical isolator 560. The cavity region 555 can, for example, provide accurate mechanical angular alignment. The optical isolator 560 can be, for example, a magneto-optic crystal sandwiched between two thin film polarizers (i.e., polarization filters), a latching magneto-optic crystal such as a latching garnet, or magneto-optic crystals which require permanent magnets attached. Due to the crystal dimensions sometimes required to achieve optical isolation, for typical optical fiber applications such as using single mode fibers operating at near infrared wavelengths around 1.3 um, micro-optics can be used to allow collimation and refocusing of the light back into an optical fiber or an additional guided wave component. Alternative configurations are possible for positioning of the optical isolator 560 which may have geometrical advantages, including tilting the cavity region 555 to an angle such as, for example, 45 degrees. A 45 degree tilt for cavity region 555 can allow larger optical isolator 560 stacks to be accommodated. For example, the optical isolator 560 can be a dual-stage isolator that can provide higher reflection suppression than a single-stage isolator. In alternate examples, the cavity 555 for the optical isolator 560 can be formed by a cavity in only in one of the micro-optic blocks 510. The cavity 555 base acts to position the isolator and allow for correct rotational placement with respect to the collimated beam.

Optionally, polarizer filters (not shown) can be replaced with Wollaston prisms before or after the curved micromirrors. Wollaston prisms can allow spatial separation of polarization states to achieve polarization-independent operation. Further optionally, free space optical components can be inserted into the micro-optic block body 520 such as thin film filters, waveplates, phase masks or combinations of such components. In addition, some channels may have and some channels may not have optical elements in the free space path, such as in situations where some channels require optical isolation and others do not. References to other free space optical components are also applicable to exemplary configurations shown in FIGS. 6A, 6B, 7A, 7B and 8 and described herein.

The multi-channel optical isolator assembly 500 of FIGS. 5C and 5D additionally includes arrays of optical fibers 540. Optical fiber arrays 540 can be, for example, single mode optical fibers. The optical fiber arrays 540 can be assembled directly into the grooves present on the collimator array block, with ribbon-based assembly providing simple multi-channel functionality in one process. The optical fibers can then be bonded in place using an adhesive and optionally held in place by a cap piece (not shown) which pushes the fibers down into the grooves during an adhesive curing process. Dashed lines 570 illustrate exemplary paths for light traveling through part of the multi-channel optical isolator assembly 500.

Although eight channels are shown in FIGS. 5A-5D (i.e., arrays of fibers 540 have 8 fibers and are 1×8 arrays), larger and smaller numbers of channels (fibers in the arrays) are possible as well. Advantageously, since examples of optical isolators described herein are compact, they can be expanded to more channels without imposing as great a device footprint penalty. For example, multiple layers of grooves and micromirrors can be integrated to allow for two dimensional arrays and higher channel counts.

Figure 6A:
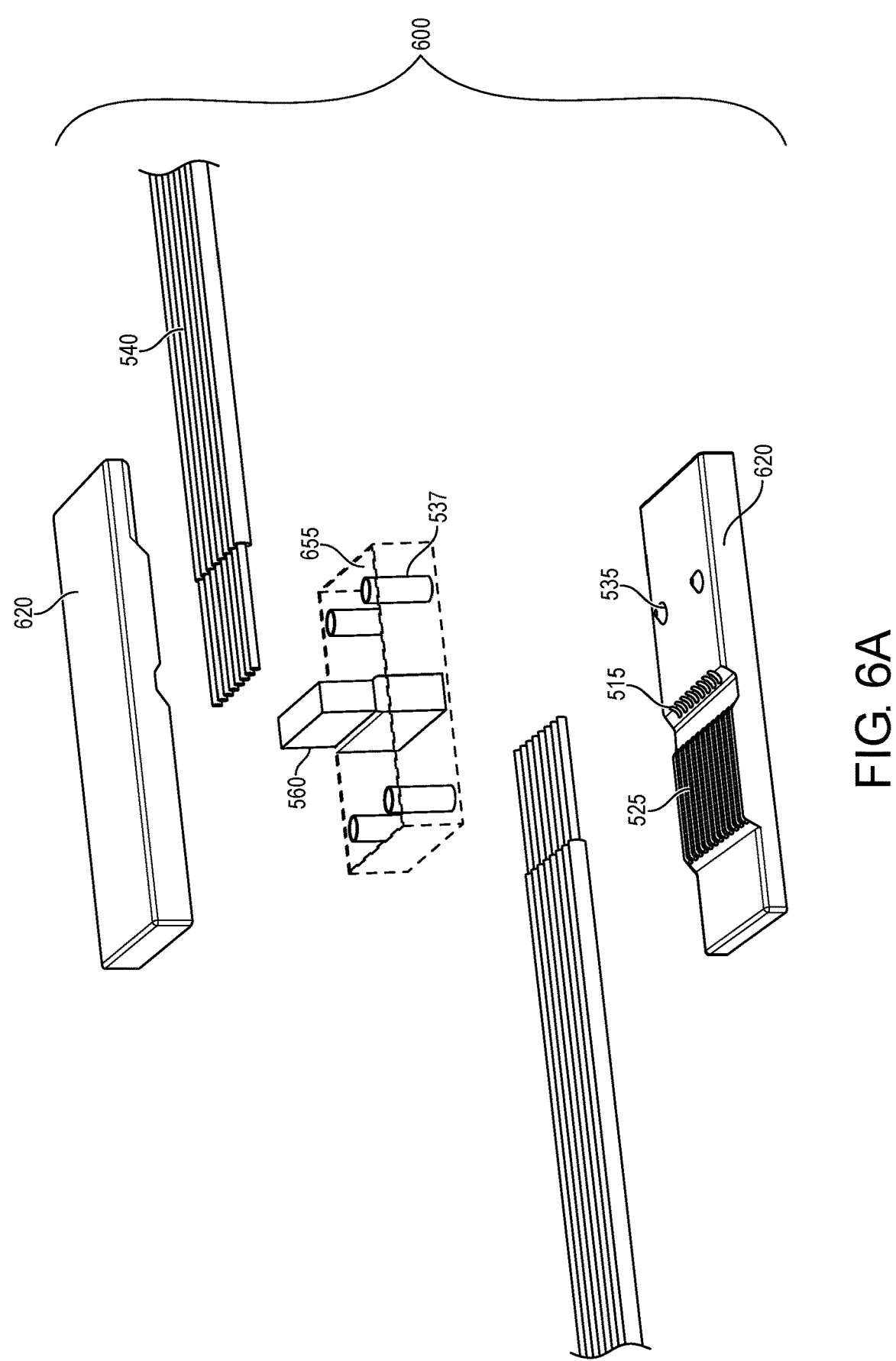
FIGS. 6A-6B illustrate a further exemplary multi-channel optical assembly.
Figure 6B:
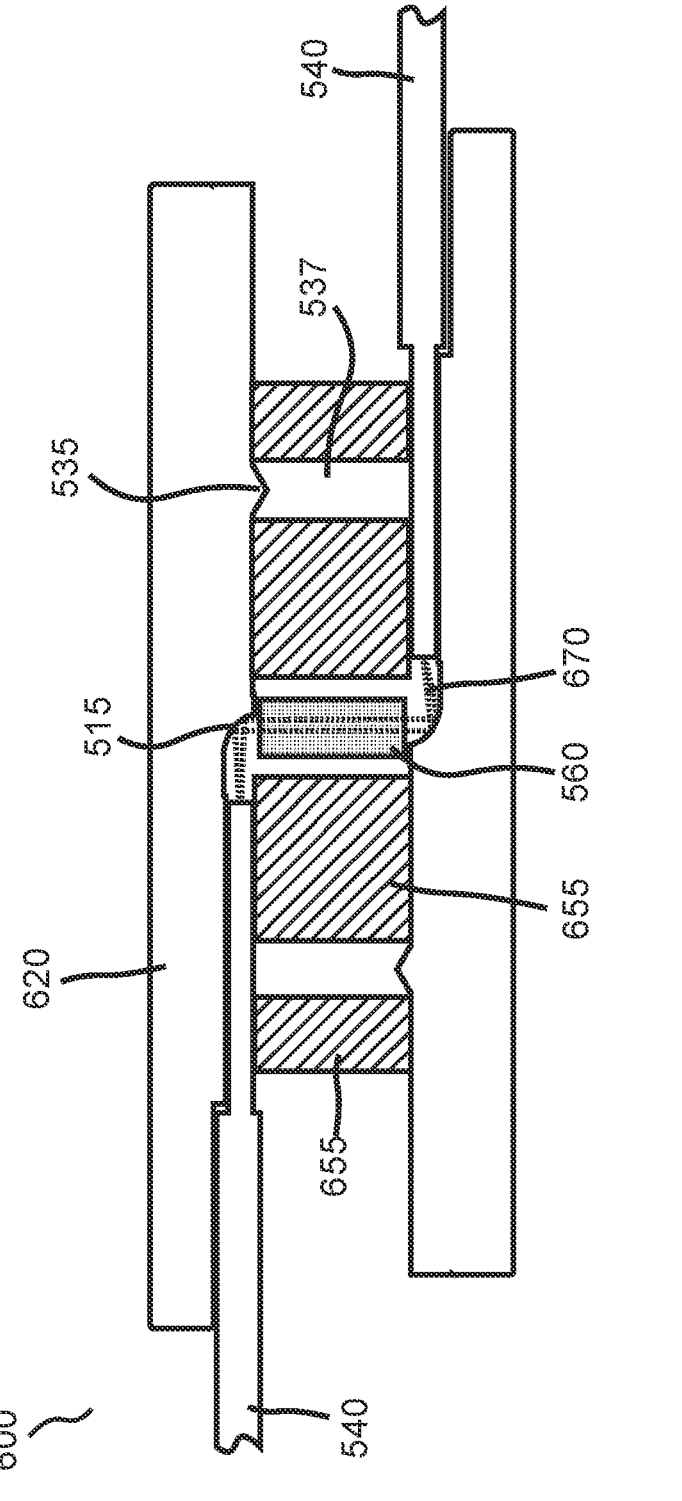

FIGS. 6A-6B show an additional example configuration for a multi-channel optical isolator assembly. FIG. 6A illustrates an exploded view and FIG. 6B illustrates a cut-though view. The descriptions for the elements herein for FIGS. 5A-5D are applicable to the parts of FIGS. 6A-6B for the elements of FIGS. 6A-6B with the same numbers as in FIGS. 5A-5D. In FIGS. 6A-6B, the multi-channel optical isolator assembly 600 includes curved micromirrors 515, a micro-optic body 620, a spacer block 655, optical isolator 560, arrays of optical fibers 540, first alignment features 535, and second alignment features 537. The spacer block 655 houses second alignment features 537 and provides a cavity for the optical isolator 560. The cavity of spacer block 655 can, for example, aid in the alignment of the optical isolator 560. The array of grooves 525 for receiving the array of optical fibers 540 can be seen in FIG. 6A. Dashed lines 670 in FIG. 6B illustrate exemplary paths for light traveling through part of the multi-channel optical isolator assembly 600.

Figure 7A:
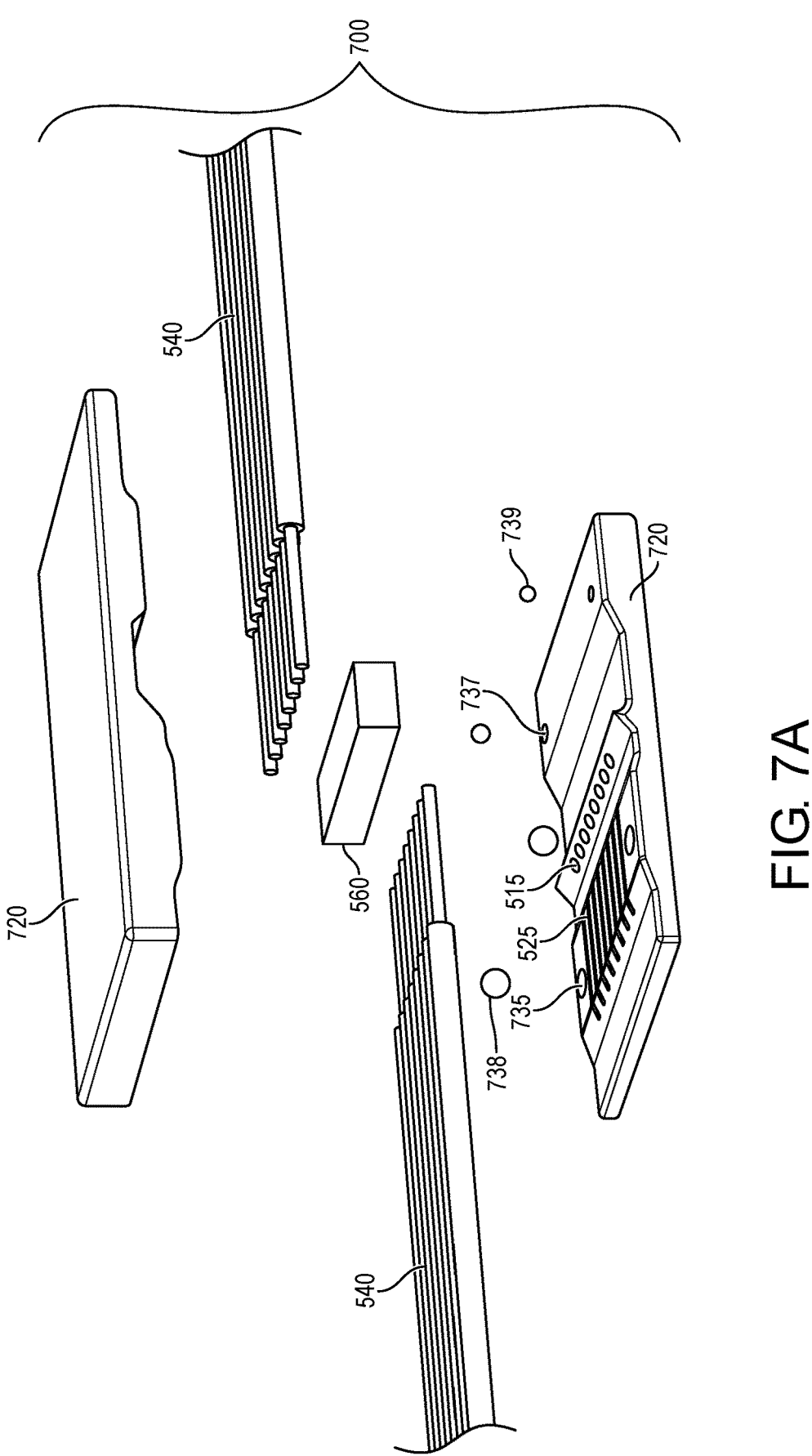
FIGS. 7A-7B provide an additional exemplary multi-channel optical assembly.
Figure 7B:
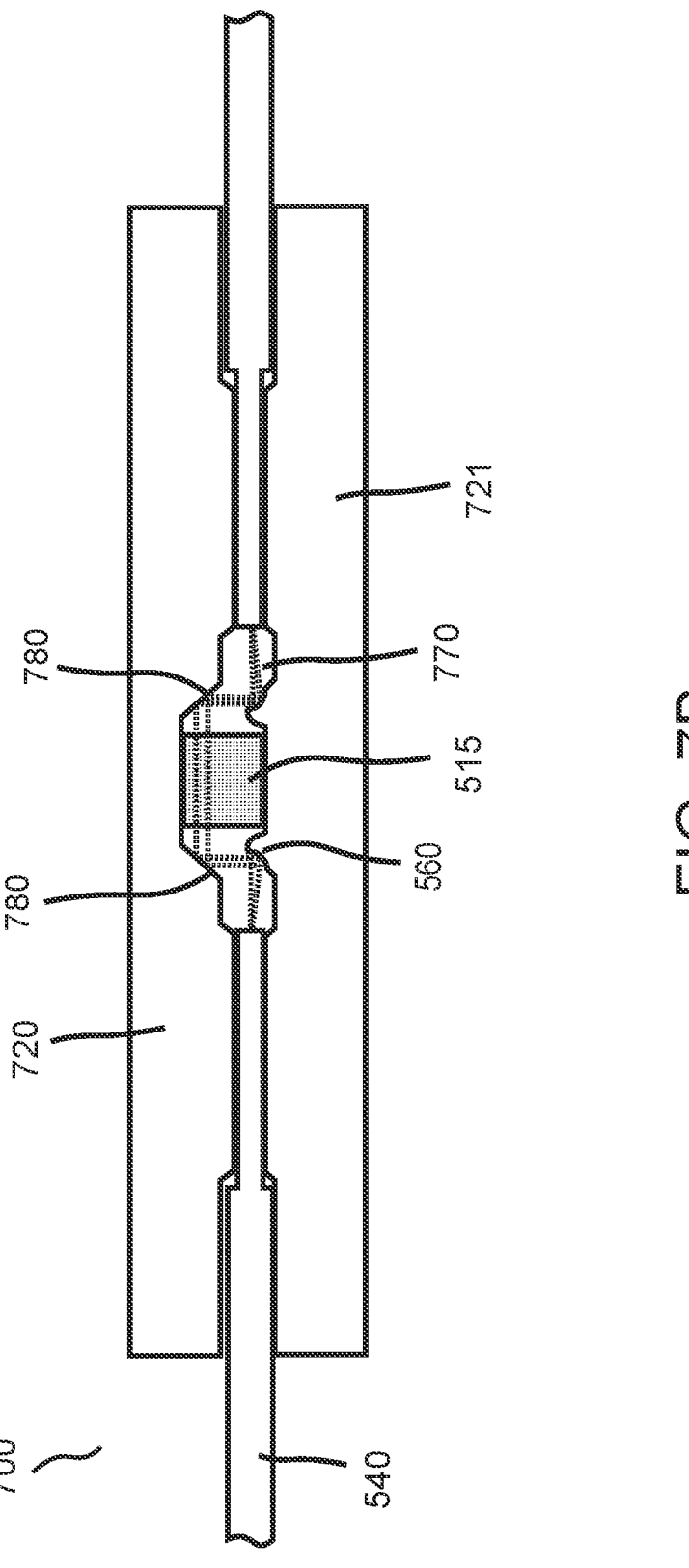

FIGS. 7A-7B show a further example configuration for a multi-channel optical isolator assembly. The descriptions for the elements herein for FIGS. 5A-5D and FIGS. 6A-6B are applicable to the parts of FIGS. 7A-7B for the elements of FIGS. 6A-6B with the same numbers as in FIGS. 5A-5D and FIGS. 6A-6B. In FIGS. 7A-7B, the multi-channel optical isolator assembly 700 includes curved micromirrors 515, a first micro-optic body 720, a second micro-optic body 721, optical isolator 560, arrays of optical fibers 540, first alignment features 735, and second alignment features 737. Alignment bodies 738 and 739 fit into first alignment features 735 and second alignment features 737, respectively and aid alignment of the optical components. Although spheres are shown, other shapes are possible for alignment bodies 738 and 739. Micro-optic body 720 includes reflective surfaces 780. Reflective surfaces 780 can be planar mirrors, for example. The first micro-optic body 720 and/or the second micro-optic body 721 can be, for example, metal pieces. The array of grooves 525 for receiving the optical fiber arrays 540 can be seen in FIG. 7A as part of micro-optic body 721. Dashed lines 770 in FIG. 7B illustrate exemplary paths for light traveling through part of the multi-channel optical isolator assembly 700.

Figure 8:
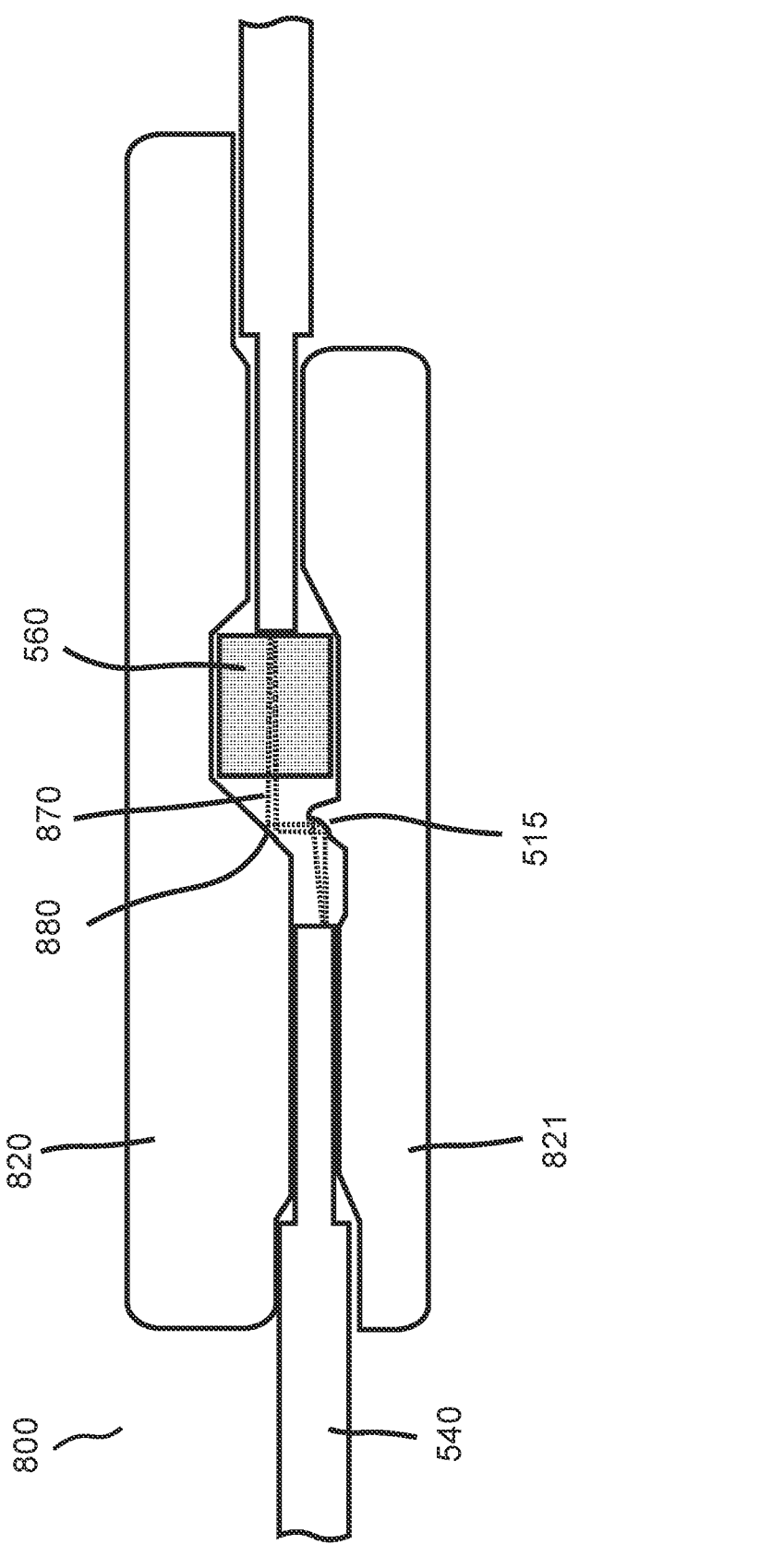
FIG. 8 shows an additional example of a multi-channel optical assembly.

FIG. 8 illustrates a further example low profile configuration for a multi-channel optical isolator assembly. The descriptions for the elements herein for FIGS. 5A-5D and FIGS. 6A-6B are applicable to the parts of FIGS. 7A-7B for the elements of FIGS. 6A-6B with the same numbers as in FIGS. 5A-5D and FIGS. 6A-6B. In FIG. 8, the multi-channel optical isolator assembly 800 includes curved micromirror 515, a first micro-optic body 820, a second micro-optic body 821, optical isolator 560, arrays of optical fibers 540. Micro-optic body 820 includes reflective surfaces 880. Reflective surfaces 880 can be planar mirrors, for example. The first micro-optic body 820 and/or the second micro-optic body 821 can be, for example, metal pieces. Although not shown, the multi-channel optical isolator assembly 800 includes arrays of grooves for receiving the array of optical fibers 540 and optional alignment features, such as those described herein. Dashed lines 870 in FIG. 7B illustrate exemplary paths for light traveling through part of the multi-channel optical isolator assembly 800.

Although eight channels are shown in FIGS. 6A-6B, FIGS. 7A-7B, and FIG. 8 (i.e., arrays of fibers 540 have 8 fibers and are 1×8 arrays), larger and smaller numbers of channels (fibers in the arrays) are possible as well. Advantageously, since examples of optical isolators described herein are compact, they can be expanded to more channels without imposing as great a device footprint penalty. For example, multiple layers of grooves and micromirrors can be integrated to allow for two dimensional arrays and higher channel counts.

An example method that can be used to manufacture components of a multi-channel optical isolator assembly is ultrashort-pulse laser direct writing. This process can form collimator arrays in transparent substrates such as glass and allows for high precision 3D patterning of the micro-optic and micromechanical features using a two stage process of laser irradiation followed by chemical etching. The laser patterning locally increases the etch rate of the glass, allowing 3D structure formation following the chemical etching step. The micro-optic features can be finished using a further laser processing step such as $CO_2$ laser polishing to reduce the surface roughness. Alternatively the micro-mechanical and micro-optic structures can be formed using high precision stamping. In this case the features can be formed in, for example. low CTE (coefficient of thermal expansion) metal alloys suitable for fiber optic assembly. Additional techniques for fabrication include hot embossing, and injection molding.

Figure 9:
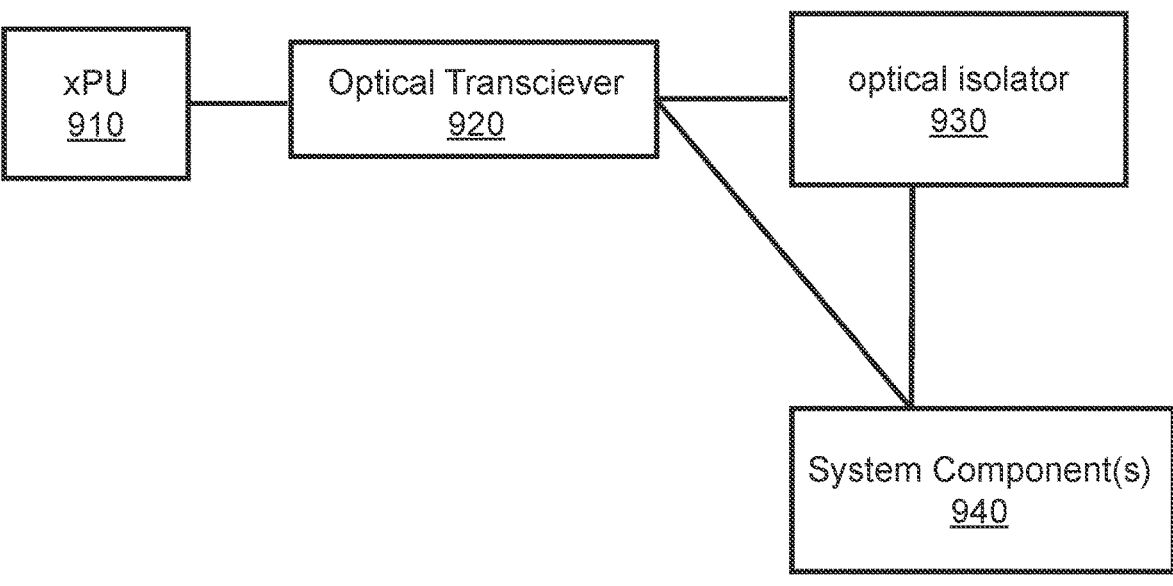
FIG. 9 diagrams an exemplary system including a multi-channel optical assembly.

FIG. 9 diagrams part of exemplary computing system that includes a multi-channel optical isolator assembly. The multi-channel optical isolator assembly can be any of the assemblies described herein. Multi-channel optical isolator assemblies described herein are useful, for example, for optical data transfer in computing applications, such as for example, in data centers and high performance computing applications, for board to board IO, for memory to and from a CPU (central processing unit) or GPU (graphics processing unit) IO, chip to chip interconnects, and memory extension, among others. In FIG. 9, an xPU 910, such as, for example, CPU (central processing unit), GPU (graphics processing unit), infrastructure processing unit (IPU) or data processing unit (DPU), and/or GPGPU (general purpose computing on graphics processing units), is coupled to an optical transceiver 920 for IO. The optical transceiver 920 comprises lasers and detectors and converts optical signals to electrical signals. The laser portion of the optical transceiver 920 is coupled to a multi-channel optical isolator assembly 930. The multi-channel optical isolator assembly 930 is a multi-channel optical isolator assembly as described herein. The xPU 910 is communicatively coupled to system components 940, such as, for example, memory, storage, interface components, other xPUs, and/or other components as described here and by FIG. 11 and the accompanying description.

Figure 10:
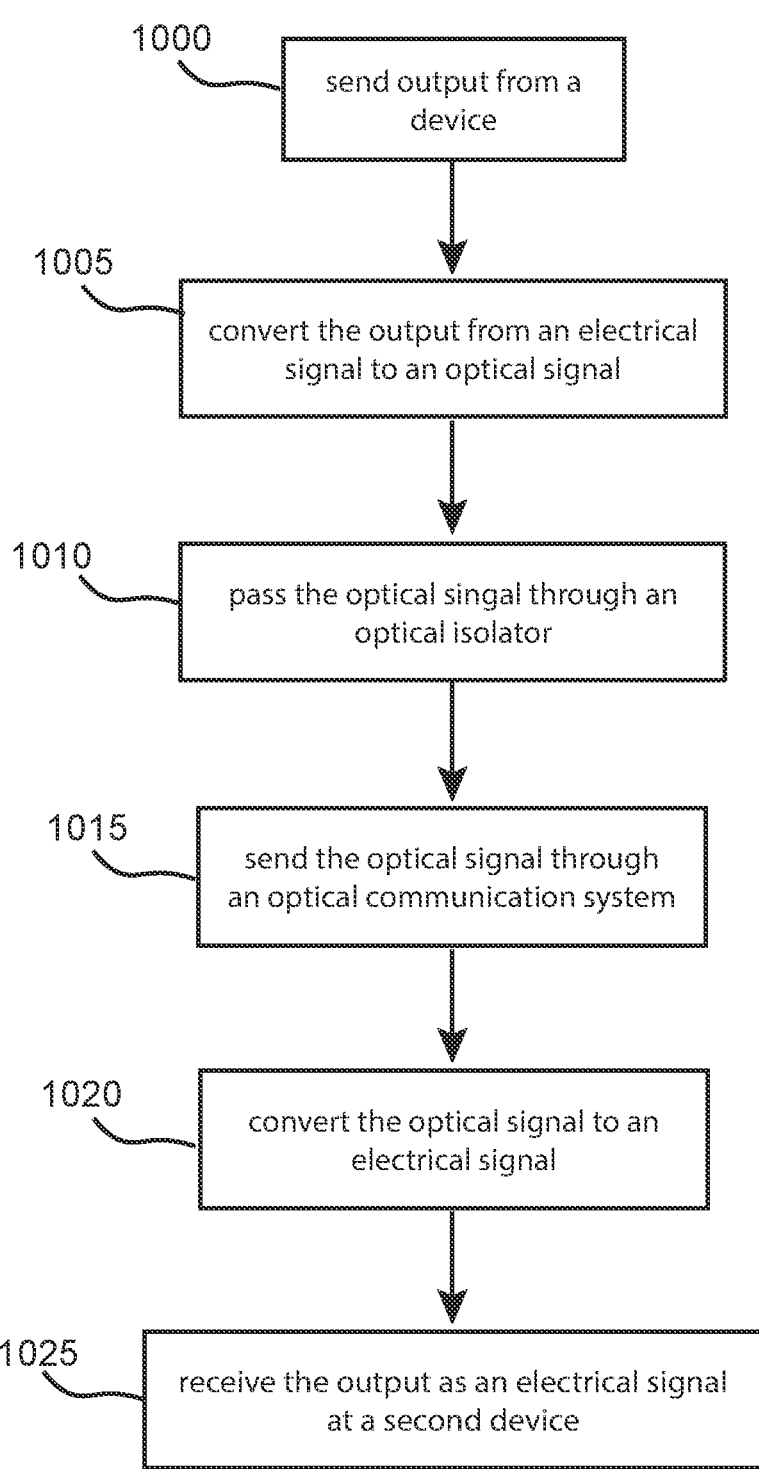
FIG. 10 provides an exemplary method for optical input output.

FIG. 10 illustrates a method for optical IO in which the devices and assemblies described herein can be employed. In FIG. 10, output is sent from a device 1000. The device can be, for example, an xPU, such as, for example, CPU, GPU, IPU, DPU, or a GPGPU, or another device on an optical network, such as for example, a memory or storage device. The output is converted from an electrical signal to an optical signal 1005 by an optical transceiver. The optical output signal is passed through an optical isolator 1010. The optical isolator can be any of the optical isolator assemblies described herein. The optical signal travels through an optical network or other communication system 1015 to its destination. It may also pass through one or more routers. The destination can be, for example, an xPU, such as, for example, CPU, GPU, IPU, DPU, or a GPGPU, or another device on an optical network, such as for example, a memory or storage device. The optical signal is converted into an electrical signal by a transceiver 1020. The electrical signal is received at the second device (destination) 1025.

Figure 11:
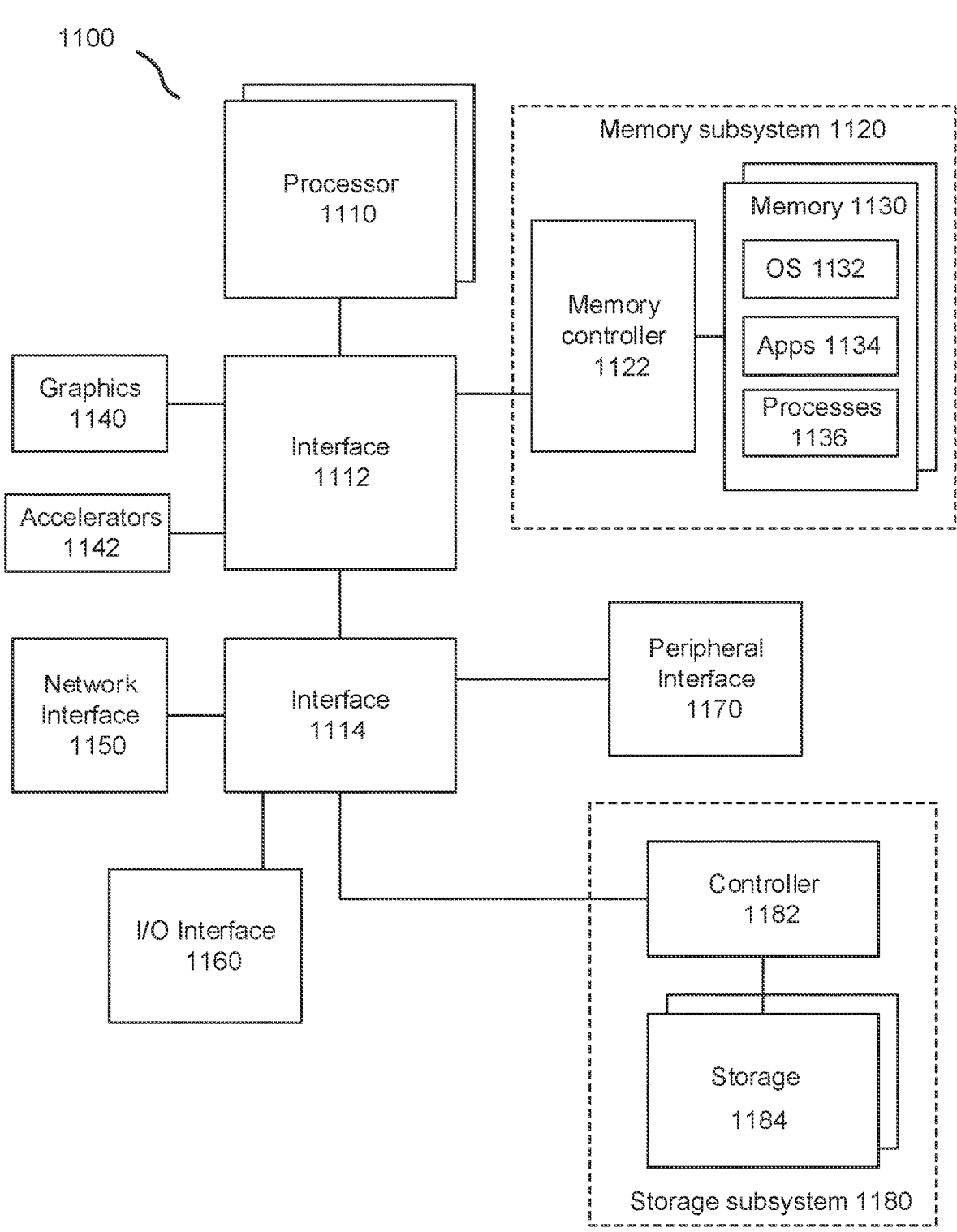
FIG. 11 provides an exemplary computing system in which a multi-channel optical assembly can be deployed.

FIG. 11 depicts an example computing system in which a multi-channel optical isolator assembly can be used. The multi-channel optical isolators as described herein can be used as components of an optical IO system for the computing system of FIG. 11. A computing system can include more, different, or fewer features than the one described with respect to FIG. 11.

Computing system 1100 includes processor 1110, which provides processing, operation management, and execution of instructions for system 1100. Processor 1110 can include any type of microprocessor, CPU (central processing unit), GPU (graphics processing unit), processing core, or other processing hardware to provide processing for system 1100, or a combination of processors or processing cores. Processor 1110 controls the overall operation of system 1100, and can be or include, one or more programmable general-purpose or special-purpose microprocessors, DSPs, programmable controllers, ASICs, programmable logic devices (PLDs), or the like, or a combination of such devices.

In one example, system 1100 includes interface 1112 coupled to processor 1110, which can represent a higher speed interface or a high throughput interface for system components needing higher bandwidth connections, such as memory subsystem 1120 or graphics interface components 1140, and/or accelerators 1142. Interface 1112 represents an interface circuit, which can be a standalone component or integrated onto a processor die. Where present, graphics interface 1140 interfaces to graphics components for providing a visual display to a user of system 1100. In one example, the display can include a touchscreen display.

Accelerators 1142 can be a fixed function or programmable offload engine that can be accessed or used by a processor 1110. For example, an accelerator among accelerators 1142 can provide data compression (DC) capability, cryptography services such as public key encryption (PKE), cipher, hash/authentication capabilities, decryption, or other capabilities or services. In some cases, accelerators 1142 can be integrated into a CPU socket (e.g., a connector to a motherboard (or circuit board, printed circuit board, mainboard, system board, or logic board) that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1142 can provide multiple neural networks, CPUs, processor cores, general purpose graphics processing units, or graphics processing units can be made available for use by artificial intelligence (AI) or machine learning (ML) models.

Memory subsystem 1120 represents the main memory of system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as static RAM (SRAM), dynamic RAM (DRAM), synchronous DRAM (SDRAM) and/or or other memory devices, or a combination of such devices. Memory 1130 stores and hosts, among other things, operating system (OS) 1132 that provides a software platform for execution of instructions in system 1100, and stores and hosts applications 1134 and processes 1136. In one example, memory subsystem 1120 includes memory controller 1122, which is a memory controller to generate and issue commands to memory 1130. The memory controller 1122 can be a physical part of processor 1110 or a physical part of interface 1112. For example, memory controller 1122 can be an integrated memory controller, integrated onto a circuit within processor 1110.

System 1100 can also optionally include one or more buses or bus systems between devices, such memory buses, graphics buses, and/or interface buses. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a PCI (peripheral component interconnect) or PCIe (PCI express) bus, a Hyper Transport or industry standard architecture (ISA) bus, a small computer system interface (SCSI) bus, a universal serial bus (USB), or a Firewire bus.

In one example, system 1100 includes interface 1114, which can be coupled to interface 1112. In one example, interface 1114 represents an interface circuit, which can include standalone components and integrated circuitry. In one example, user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB, or other wired or wireless standards-based or proprietary interfaces. Network interface 1150 can transmit data to a device that is in the same data center or rack or a remote device, which can include sending data stored in memory.

Some examples of network interface 1150 are part of an infrastructure processing unit (IPU) or data processing unit (DPU), or used by an IPU or DPU. An xPU can refer at least to an IPU, DPU, GPU, GPGPU (general purpose computing on graphics processing units), or other processing units (e.g., accelerator devices). An IPU or DPU can include a network interface with one or more programmable pipelines or fixed function processors to perform offload of operations that can have been performed by a CPU. The IPU or DPU can include one or more memory devices.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include additional types of hardware interfaces, such as, for example, interfaces to semiconductor fabrication equipment and/or electrostatic charge management devices.

In one example, system 1100 includes storage subsystem 1180. Storage subsystem 1180 includes storage device(s) 1184, which can be or include any conventional medium for storing data in a nonvolatile manner, such as one or more magnetic, solid state, and/or optical based disks. Storage 1184 can be generically considered to be a "memory," although memory 1130 is typically the executing or operating memory to provide instructions to processor 1110. Whereas storage 1184 is nonvolatile, memory 1130 can include volatile memory (e.g., the value or state of the data is indeterminate if power is interrupted to system 1100). In one example, storage subsystem 1180 includes controller 1182 to interface with storage 1184. In one example controller 1182 is a physical part of interface 1112 or processor 1110 or can include circuits or logic in both processor 1110 and interface 1114.

A power source (not depicted) provides power to the components of system 1100. More specifically, power source typically interfaces to one or multiple power supplies in system 1100 to provide power to the components of system 1100.

Exemplary systems may be implemented in various types of computing, smart phones, tablets, personal computers, and networking equipment, such as switches, routers, racks, and blade servers such as those employed in a data center and/or server farm environment.

Optical connections (with optical isolators) can be used to replace data path connections traditionally implemented in the electrical domain. Optical connections are especially useful where bandwidth and/or distance limitations are a consideration, such as, for example, between multiple processors (1110), and all links depicted as single lines (e.g., between 1112 to 1140, 1142, 1114 and 1122, between 1114 and 1150 and 1182, between 1122 and 1130, between 1182 and 1184, etc.) in FIG. 11.

Besides what is described herein, various modifications can be made to what is disclosed without departing from the scope of embodiments of the invention. Therefore, the illustrations and examples herein should be construed in an illustrative, and not a restrictive sense. The scope of embodiments of the invention should be measured solely by reference to the claims that follow.

What is claimed is:

1. An optical assembly comprising:
an optical isolator;
at least two gradient index (GRIN) lens arrays wherein a first GRIN lens array is an input lens for the optical isolator and a second GRIN lens array is an output lens for the optical isolator;
at least two fiber arrays wherein a first fiber array is optically coupled to the first GRIN lens array and a second fiber array is optically coupled to the second GRIN lens array; and
a housing wherein the housing comprises first, second, third, and fourth arrays of grooves and wherein fibers of the first fiber array are in the first array of grooves, the fibers of the second array of fibers are in the second array of grooves; wherein the first GRIN lens array is in the third array of grooves, wherein the second GRIN lens array is in the fourth array of grooves, and wherein the first array of grooves, the second array of grooves, and the third array of grooves, and the fourth array of grooves are not contiguous with each other.

2. The optical assembly of claim 1, wherein the assembly additionally comprises an optical index-matching epoxy between the first fiber array and the first GRIN lens array.

3. The optical assembly of claim 1 wherein the GRIN lens array is comprised of a plurality of multi-mode optical fibers arrayed with a center-to-center pitch of less than or equal to 0.25 mm.

4. The optical assembly of claim 1 wherein the optical isolator is comprised of a magneto-optic crystal.

5. The optical assembly of claim 1 wherein the first fiber array is comprised of single mode fibers.

6. The optical assembly of claim 1 wherein the first fiber array is comprised of at least 8 fibers.

7. The optical assembly of claim 1 wherein the housing additionally comprises alignment features.

8. An optical assembly comprising:
an optical isolator;
an array of micromirrors;
at least two fiber arrays wherein a first fiber array of the at least two fiber arrays is optically coupled to the array of micromirrors; and
a housing comprising at least two blocks, wherein each of the blocks has arrays of grooves, wherein fibers of the first fiber array are in a first array of grooves, and the fibers of a second array of fibers are in a second array of grooves; and wherein a mating of the first block and the second block forms a cavity and the cavity holds the optical isolator, and wherein the array of micromirrors is in a first block of the housing comprising at least two blocks.

9. The optical assembly of claim 8 wherein the optical isolator comprised of a magneto-optic crystal.

10. The optical assembly of claim 8 wherein the first fiber array is comprised of single mode fibers.

11. The optical assembly of claim 8 wherein the first fiber array is comprised of at least 8 fibers.

12. The optical assembly of claim 8 wherein a first block of the at least two blocks and a second block of the at least two blocks additionally comprise alignment features for mating the first block with the second block of the at least two blocks.

13. A computing system comprising:
a processor;
memory; and
a multichannel optical assembly comprising:
    an optical isolator;
    an array of micromirrors;
    at least two fiber arrays wherein a first fiber array of the at least two fiber arrays is optically coupled to the array of micromirrors; and
    a housing comprising at least two blocks, wherein each of the blocks has arrays of grooves and wherein fibers of the first fiber array are in a first array of grooves, the fibers of a second array of fibers are in a second array of grooves, wherein a mating of the first block and the second block forms a cavity and the cavity holds the optical isolator, and wherein the array of micromirrors is in a first block of the housing comprising at least two blocks;
wherein the multichannel optical assembly is coupled to the processor and coupled to the memory.

14. The computing system of claim 13 wherein the optical isolator comprised of a magneto-optic crystal rotator.

15. The computing system of claim 13 wherein the first fiber array is comprised of single mode fibers.

16. The computing system of claim 13 additionally comprising a second array of micromirrors wherein the second array of micromirrors is in a second block of the housing comprising at least two blocks.

17. The computing system of claim 13 wherein a first block of the at least two blocks and a second block of the at least two blocks additionally comprise alignment features.

18. A computing system comprising:
a processor;
memory; and
a multichannel optical assembly comprising:
    an optical isolator;
    at least two gradient index (GRIN) lens arrays wherein a first GRIN lens array is an input lens for the optical isolator and a second GRIN lens array is an output lens for the optical isolator;
    at least two fiber arrays wherein a first fiber array is optically coupled to the first GRIN lens array and a second fiber array is optically coupled to the second GRIN lens array; and
    a housing wherein the housing comprises arrays of grooves, wherein fibers of the first fiber array are in a first array of grooves and the fibers of a second array of fibers are in a second array of grooves, wherein the housing includes a first block having a first array of grooves and a second block having a second array of grooves; and wherein a mating of the first block and the second block forms a cavity and the cavity holds the optical isolator;
wherein the multichannel optical assembly is coupled to the processor and the memory.

19. The computing system of claim 18 wherein the GRIN lens array is comprised of multi-mode fibers.

20. The computing system of claim 18 wherein the housing additionally comprises alignment features for mating the first block to the second block.

* * * * *